United States Patent [19]
Wohler, Jr.

[11] 3,774,608
[45] Nov. 27, 1973

[54] RUMEN DRENCHING DEVICE
[76] Inventor: Wilson H. Wohler, Jr., 3528 49th Pl., Lubbock, Tex. 79413
[22] Filed: Sept. 7, 1972
[21] Appl. No.: 287,084

[52] U.S. Cl.................. 128/223, 128/351, 128/356
[51] Int. Cl.............................................. A61d 7/00
[58] Field of Search.................. 128/3, 223, 351, 128/356, 348

[56] References Cited
UNITED STATES PATENTS

| | | | |
|---|---|---|---|
| 874,239 | 12/1907 | Ratliff | 128/223 |
| 1,293,306 | 2/1919 | Beck | 128/356 |
| 2,445,279 | 7/1948 | Palm et al. | 128/223 X |
| 2,668,528 | 2/1954 | Frick | 128/3 |
| 3,175,557 | 3/1965 | Hammond | 128/351 |
| 3,659,612 | 5/1972 | Shiley et al. | 128/351 |

Primary Examiner—Aldrich F. Medbery
Attorney—Charles W. Coffee

[57] ABSTRACT

To drench a calf, a tubular esophageal speculum is inserted through the mouth of the calf into the esophagus. The speculum has a knob on the end which will enter the esophagus, but is larger than the larnyx so it will not enter the larynx and it also will not pass the thoracic inlet. With the esophageal speculum safely in the esophagus, a flexible tube in extended from the end of the speculum into the rumen and the fluid pumped therethrough, thus accomplishing the direct rumen drenching process.

16 Claims, 3 Drawing Figures

Patented Nov. 27, 1973
3,774,608
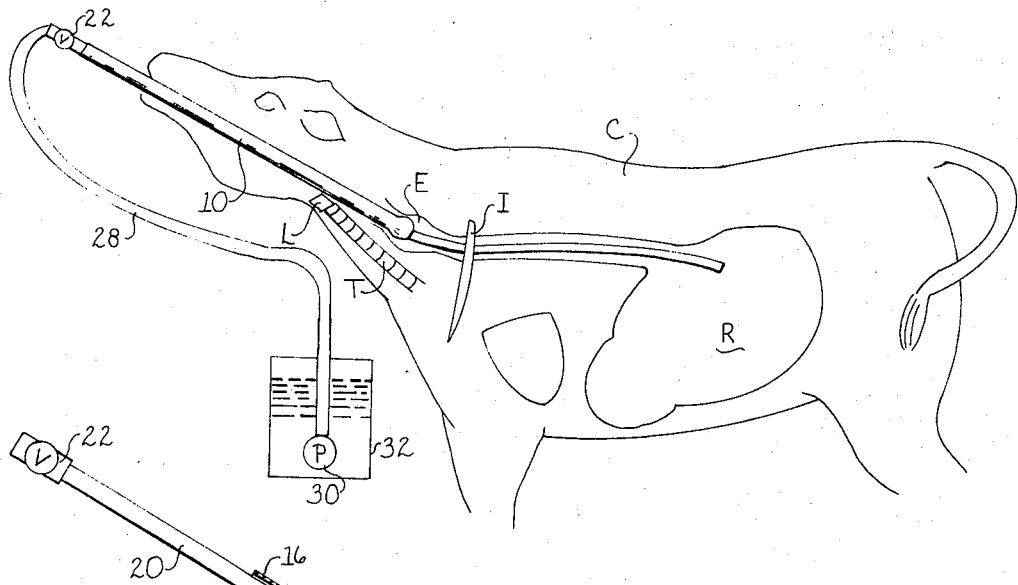
Fig. 1.
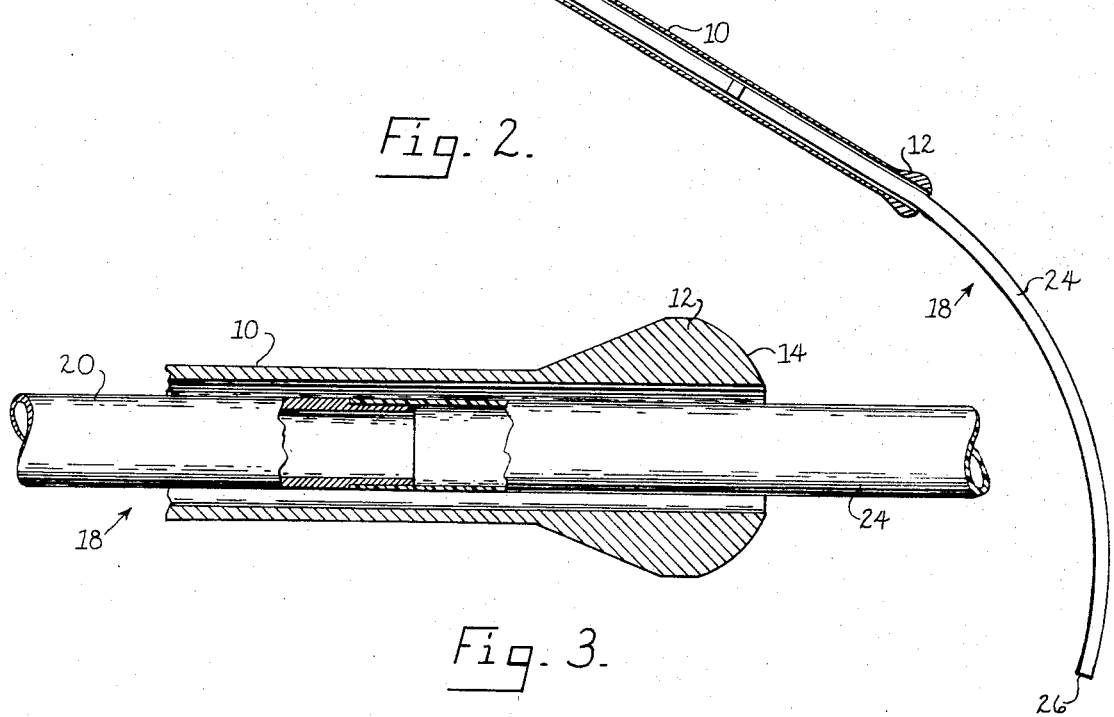
Fig. 2.
Fig. 3.

3,774,608

RUMEN DRENCHING DEVICE

BACKGROUND OF THE INVENTION

1. Field of the Invention

This invention relates to veterinary oral dosing devices. More particularly, it relates to an esophageal speculum for drenching cattle.

2. Description of the Prior Art

For many years veterinarians have been forcing doses of liquid into animals. According to the prior common practice, the veterinarian forced a tube through the mouth and into the esophagus of an animal until it reached the rumen, which is a portion of its stomach. Then, the fluid was pumped through the tube and esophagus. This is not a difficult procedure for a veterinarian inasmuch as the veterinarian is well acquainted with where the esophagus opens into the mouth of the animal and can readily distinguish when the tube enters the esophagus as distinguished when it enters the larynx. Furthermore, the veterinarian, being skilled in his art, can listen to the tube and determine from the rumblings of the rumen whether the tube has reached the rumen or whether it has entered into the trachea, which is important to prevent drowning the animal. Also, if the tube of the prior art is not inserted through the esophagus past the thoracic inlet, the liquid will sometimes back-flow around the sides of the tube back up the esophagus into the mouth of the animal where it is possible the liquid will flow into the trachea into the lungs of the animal. The animal with the tube in his throat cannot otherwise swallow the material to prevent its entrance into the larynx and trachea and lungs. The result is generally as fatal as if the liquid were pumped directly into the lungs of the animal.

However, with the event of the mass handling of cattle in feed yards where hundres of animals are treated every day, it has been suggested as beneficial to drench each animal with a liquid upon entering the feed yard; therefore, inasmuch as so many cattle are being drenched, it is necessary that laborers having considerably less skill than the veterinarian be used to administer the drench. The benefits of the procedure are sometimes outweighed when a mistake is made and the tube enters the larynx and trachea and the liquid is pumped into the animal's lungs and the animal drowned.

The following patents show examples of instruments used previously:

Cooper U.S. Pat. No. 260,957, Whitelock U.S. Pat. No. 405,137, Jones U.S. Pat. No. 969,482, Baker U.S. Pat. No. 1,266,383, Stricklen U.S. Pat. No. 2,170,599, Palm et al, U.S. Pat. No. 2,445,279, McKay U.S. Pat. No. 2,643,655

Also, it has been suggested that a short 14 inch pipe be placed around the tube to prevent the animals from biting the tube.

SUMMARY OF THE INVENTION

New and Different Function

I have invented a drenching device. It comcrises a cylindrical tube with a knob on the end thereof, which is too large to pass through the larynx into the trachea; however, it can be easily passed into the esophagus as far as the thoracic inlet. I call this portion an esophageal speculum. Once the esophageal speculum is in the esophagus, it is an easy matter to extend a flexible tube through the speculum and into the rumen of the calf. With my device, even in the hands of unskilled laborers, it is certain that the tube is inserted into the esophagus and on to the rumen and not into the trachea leading into the lung. Also of great importance is the fact that with the flexible tube extended into the rumen or even near the rumen (past the thorasic inlet), the liquid can be administered at a rapid rate without backflowing into the mouth of the animal; thereby, allowing for the rapid treatment of many animals.

An average calf of 450 pounds entering the feed lot and lank from hauling or sickness can readily take fluid material administered into the rumen at the rate of 1 gallon per 10 or less seconds, the total quantity amounting to three gallons. Therefore, it is not difficult for average feed lot personnel to treat cattle with this device at a rate of one animal per 60 seconds or less total elapsed time.

The esophagus of the calves are all about the same size for any given size animal. Also, standard procedure is that normally any load of cattle will be about the same size. I.e., when cattle are shipped to a feed lot, normally, a load of cattle will be about the same weight and size; therefore, the selected size speculum can be used for the entire load. Larger cattle will be drenched with a larger speculum because of their larger esophagus and larger larynx, the larger knob on the speculum preventing entry of the larynx.

OBJECTS OF THIS INVENTION

An object of this invention is to drench cattle.

Further objects are to achieve the above with a device that is sturdy, compact, durable, lightweight, simple, safe, efficient, versatile, and reliable, yet inexpensive and easy to manufacture, operate, and maintain.

Other objects are to achieve the above with a method that is versatile, rapid, efficient, and inexpensive, and does not require skilled people to adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 1 is a schematic representation of a calf with a drenching device according to my invention shown in approximate place, with auxiliary equipment also shown schematically.

FIG. 2 shows a side sectional view of the drenching device with some parts shown schematically for clarity.

FIG. 3 is an enlarged sectional view of the knob on the end of the speculum with the liquid tubes telescoped therein.

DESCRIPTION OF THE PREFERRED EMBODIMENT

As seen in the attached drawing, particularly referring to FIG. 1, there is illustrated the device in use. There is seen a calf C shown schematically. Esophagus E is shown extending from the mouth to rumen R, a portion of the stomach. The esophagus passes through thoracic inlet I as defined by the first rib of the calf. Also shown in trachea T to which larynx L forms the opening from the mouth.

Speculum 10 is tubular, preferably made of stainless steel. It is desirable to make the speculum 10 of non-corrosive material so it can be disinfected with strong chemicals; also, it is desirable that it be hard. Calves tend to bite the device and scar it with their teeth. Other hard, noncorrosive materials are suitable.

The speculum 10 has knob 12 on the entering end. The knob 12 has sperical portion 14 to form a rounded edge so it readily expands the esophagus as it enters. The knob 12 is too large to enter the larynx or to pass through the thorasic inlet, but it will enter the esophagus. I have found that the knob 12 can be readily graded for the size animal, and suitable sizes in relation to weight are as follows:

| Weignt in lb. | Knob Diameter inches |
|---|---|
| 200–350 | 1¼ |
| 300–500 | 1½ |
| 475–650 | 1¾ |
| 625–up | 1⅞ |

For the purposes of administering medication to calves of very young age, a special speculum may be constructed with knobs as small as one inch. However, for feed lot purposes, cattle less than 200 pounds are almost never placed in feed lots; therefore, the 1-¼ inch size is the smallest size contemplated for feed lot purposes. As seen in the above chart, the diameter of the entry end is about 1 inch plus one-eighth inch for every 100 lbs weight of the animal.

Normally, the weight of the calf will be known or readily estimated, even by unskilled workers; therefore, a speculum according to the weight of the calf can be used. It will be noted there is an overlap in the weights. Therefore, if cattle weighing about 450 pounds are being handled, the speculum having a 1-½ inches knob can be used and this would be satisfactory even though some of the cattle weighed up to 500 pounds. On the other hand if cattle weighing about 550 pounds were being handled, the 1-¾ inches knob on the speculum would be used and this would be satisfactory even though some of the cattle were as light as 475 pounds.

Also, it will be understood that any cylindrical forward-leading front on the entry end of the speculum 10, besides gently opening the esophagus, will form a valve-like connection at the thorasic inlet which helps to aid prevention of the liquid back-flowing from the rumen back to the mouth. If the back-flow were to happen, as mentioned above, the calf with the speculum in his throat has no way of re-swallowing the material, which would likely pass into the larynx and on into the lungs with undesirable consequences.

Handle end 16 of the speculum 10 is opposite the entry end having the knob 12. The speculum may be knurled at 16 for ease of handling.

Liquid tube 18 is telescoped within the speculum 10. The liquid tube 18 includes rigid tube 20, preferrably made of metal, which is approximately the length of the speculum itself. Any speculum having a knob of an inch and three-quarters or larger will be approximately 30 inches in length and any speculum having a knob of less than three-quarters of an inch will be approximately 24 to 27 inches in length. Speculums for use with baby calves may be as short as 18 inches. Valve 22 is attached to the rigid tube 20 on the distal end thereof. The valve 22 can be any convenient type that is easily opened and closed.

On the entry end or the other end of the rigid tube 20 there is connected a soft, pliable, flexible tube 24. The rigid tube 20 may be knurled adjacent thereto. Although not specifically shown in the drawing, the entry end 26 of the flexible tube 24 is rounded so when the flexible tube is being extended into the rumen, it does not damage the esophagus or the rumen. The connection of the rigid tube 20 to the flexible tube 24 is accomplished by telescoping the flexible tube 24 over a recessed or knarled end of the rigid tube 20 and cementing in place. The entire fluid tube 18 could be flexible, but I find it easier to use with rigid tube 20.

The valve 22 is connected by hose 28 to pump 30 located within reservoir 32 of liquid with which the calf is to be drenched. This liquid can be a nutrient slurry or gruel or medication or the like.

In use, the calf is placed in a squeeze chute for ease of handling. To drench the calf, the tube 24 is retracted so the end 26 is within the knob 12. The calf's mouth is held open with the left hand while the speculum is inserted gently with the right hand until the knob 12 is about midway of the cervical esophagus and no further than to touch the thorasic inlet.

For the preferred operation, the knob 12 on the speculum 10 is about midway of the cervical esophagus which will be to the region of the middle of his neck. With uniform sized cattle, this will be understood even by unskilled workers with the cattle. It is necessary for proper operation according to my procedures that the knob at least enter the esophagus and to insure this I prefer that it enter about halfway through the cervical esophagus. It is entirely permissible for it to touch the thorasic inlet, however, it is not desirable for it to be jammed roughly against it inasmuch as rupture may occur. If the length of the speculum is made equal to the length from the animal's teeth to the midpoint of the cervical esophagus plus four inches for a handhold, the proper operation is nearly automatic. With a shorter speculum, it is difficult to insert it far enough. With a longer speculum, the speculum is clumsy to handle and there is great danger of roughly ramming it against the thorasic inlet. With cattle, the length will normally be twelve times the entry diameter plus nine inches with three-inch leeway.

The soft, pliable tube 24 is extended through the speculum 10 into the rumen. The valve 22 is then opened, permitting the pump 30 to pump the desired amount of liquid into the rumen. After the desired amount of liquid has been pumped, the valve 22 is closed, the tube 18 is retracted until the end 26 is within the knob 12 and the tube and speculum is removed from the animal, the animal is released and another is put into the squeeze chute for treatment.

The speculum 10 could be constructed the same diameter throughout, that being the outer diameter of what is now shown to be the knob 12. I prefer to provide a knob 12 shaped essentially similar to the bollus of a ruminant. I find there is less resistance of the animals to insertion of a speculum having a bollus-like knob on the end than there is to the insertion of a tube having this large of a diameter throughout its length. However, a tube having the same diameter throughout its length is operable.

The embodiments shown and described above are only exemplary. I do not claim to have invented all the parts, elements or steps described. Various modifications can be made in the construction, material, arrangement, and operation, and still be within the scope of my invention. The limits of the invention and the bounds of patent protection are measured by and defined in the following claims. The restrictive description and drawing of the specific example above do not point out what an infringement of this patent would be, but are to enable the reader to make and use the invention.

I claim as my invention:

1. The method of drenching ruminants and other animals comprising:
   a. selecting a speculum which has an end estimated to be larger than the animal's larynx, but smaller than its esophagus,
   b. inserting the selected speculum through the mouth and into the esophagus of the animal,
   c. extending a flexible stomach tube through the speculum into the esophagus past the thoracic inlet of the animal,
   d. pumping liquids through the stomach tube into the stomach, and
   e. withdrawing the stomach tube and speculum.

2. The invention as defined in claim 1 wherein
   f. the speculum is selected upon the basis of the weight of the animal.

3. The invention as defined in claim 1 wherein the animals being drenched are calves and
   f. the speculum is selected using a speculum with 1-¼ inches diameter end for calves weighing up to 350 lb; with 1-½ inches diameter end for calves weighing 300 lb. to 500 lb.; with 1-¾ inches diameter end for calves weighing 475 lb. to 650 lb.; and 1-⅞ inches end for calves weighing over 625 lb.

4. The invention as defined in claim 1 wherein
   f. the end of the speculum is inserted to about midpoint of the cervical esophagus.

5. The invention as defined in claim 4 wherein
   g. the speculum is selected upon the basis of the weight of the animal.

6. The invention as defined in claim 4 wherein the animals being drenched are calves and
   g. the speculum is selected using a speculum with 1-¼ inches diameter end for calves weighing up to 350 lb.; with 1-½ inches diameter end for calves weighting 300 lb. to 500 lb.; with 1-¾ inches diameter end for calves weighing 475 lb. to 650 lb.; and 1-⅞ inches end for calves weighing over 625 lb.

7. A device for drenching ruminants and other cattle comprising:
   a. a esophageal speculum in the form of
   b. a tube having
      i. an entry end and
      ii. a handle end,
      iii. the entry end having a diameter greater than the size of the larynx of the animal being drenched and small enough to easily enter the esophagus, and
      iv. the length of the speculum being about equal to the distance from the animal's teeth to midpoint of the cervical esophagus plus 4 inches for a handhold,
   c. a fluid carrying tube telescoped within the speculum,
   d. the fluid carrying tube including:
      i. a flexible tube at the entry end of the speculum,
      ii. the flexible tube being about at least as long as the speculum, and
      iii. the total fluid carrying tube being about twice the length of the speculum.

8. The invention as defined in claim 7 with an additional limitation of
   e. a smooth, rounded knob on the entry end of the speculum,
   f. the knob shaped similar to the shape of the bollus of a ruminant.

9. The invention as defined in claim 7 with an additional limitation of
   e. a valve on the end of the fluid carrying tube at the handle end of the speculum.

10. The invention as defined in claim 9 wherein said valve forms a portion of
    f. means for attaching the fluid carrying tube to a pump.

11. The invention as defined in claim 10 with an additional limitation of
    g. a smooth, rounded knob on the entry end of the speculum,
    h. the knob shaped similar to the shape of the bollus of a ruminant.

12. A device for drenching ruminants comprising:
    a. an esophageal speculum in the form of
    b. a tube having:
       i. an entry end and
       ii. a handle end,
       iii. the entry end having a diameter equal to about one inch plus one-eighth inch for every hundred pounds of body weight of the ruminant to be drenched, and
       iv. the length of the speculum being twelve times the diameter of the entry end plus between 6 to 12 inches,
    c. a fluid carrying tube telescoped within the speculum,
    d. the fluid carrying tube including:
       i. a flexible tube at the entry end of the speculum,
       ii. the flexible tube being about at least as long as the speculum, and
       iii. the total fluid carrying tube being about twice the length of the speculum.

13. The invention as defined in claim 12 with an additional limitation of
    e. a valve on the end of the fluid carrying tube at the handle end of the speculum.

14. The invention as defined in claim 13 wherein said valve forms a portion of
    f. means for attaching the fluid carrying tube to a pump.

15. The invention as defined in claim 12 with an additional limitation of
    e. a smooth, rounded knob on the entry end of the speculum,
    f. the knob shaped similar to the shape of the bollus of a ruminant.

16. The invention as defined in claim 15 with an additional limitation of
    g. a valve on the end of the fluid carrying tube at the handle end of the speculum, and
    h. said valve forms a portion of means for attaching the fluid carrying tube to a pump.

* * * * *